US008288032B2

(12) United States Patent
Mitsuda et al.

(10) Patent No.: US 8,288,032 B2
(45) Date of Patent: Oct. 16, 2012

(54) ENERGY STORAGE DEVICE CELL AND CONTROL METHOD THEREOF

(75) Inventors: Kenro Mitsuda, Tokyo (JP); Osamu Hiroi, Tokyo (JP); Daigo Takemura, Tokyo (JP); Shigeru Aihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 984 days.

(21) Appl. No.: 12/329,259

(22) Filed: Dec. 5, 2008

(65) Prior Publication Data
US 2009/0148759 A1 Jun. 11, 2009

(30) Foreign Application Priority Data

Dec. 7, 2007 (JP) ................................ 2007-316844

(51) Int. Cl.
*H01M 2/14* (2006.01)
(52) U.S. Cl. ............ 429/142; 429/9; 429/467; 429/468; 429/517; 429/518
(58) Field of Classification Search ............... 429/9, 142, 429/467, 468, 517, 518
See application file for complete search history.

(56) References Cited

U.S. PATENT DOCUMENTS

| 6,444,356 | B1* | 9/2002 | Ma et al. ....................... 429/145 |
| 8,007,936 | B2* | 8/2011 | Ando et al. .................... 429/152 |
| 2009/0065730 | A1* | 3/2009 | Yoshino et al. ............... 252/62.2 |
| 2009/0123823 | A1 | 5/2009 | Ando et al. |

FOREIGN PATENT DOCUMENTS

| JP | 9-50800 | 2/1997 |
| JP | 2001-351688 | 12/2001 |
| JP | 2002-118036 | 4/2002 |
| JP | 2004-266091 | 9/2004 |
| JP | 2004-355823 | 12/2004 |
| JP | 2005-38612 | 2/2005 |
| JP | 2006-40748 | 2/2006 |
| JP | 2006-172966 | 6/2006 |
| JP | 2006-286218 | 10/2006 |
| JP | 2007-87801 | 4/2007 |
| JP | 2009-26480 | 2/2009 |
| JP | 2009-123385 | 6/2009 |
| WO | WO 03/003395 A1 | 1/2003 |

OTHER PUBLICATIONS

Japanese Office Action issued Jan. 10, 2012 in patent application No. 2007-316844 with English translation.
U.S. Appl. No. 13/287,383, filed Nov. 2, 2011, Mitsuda, et al.

* cited by examiner

*Primary Examiner* — Patrick Ryan
*Assistant Examiner* — Ladan Mohaddes
(74) *Attorney, Agent, or Firm* — Oblon, Spivak, McClelland, Maier & Neustadt, L.L.P.

(57) ABSTRACT

An energy storage device cell includes: a capacitor cathode including a capacitor cathode collector foil, and a capacitor cathode electrode layer formed on one face of the capacitor cathode collector foil and containing microparticles of activated carbon; a first separator; a common anode including an anode collector foil having a through-hole, and an anode electrode layer formed on one face of the anode collector foil; a second separator; and a battery cathode including a battery cathode collector foil, and a battery cathode electrode layer formed on one face of the battery cathode collector foil and containing particles of a lithium-containing metal compound. The first separator is sandwiched by the capacitor cathode electrode layer and the anode electrode layer. The second separator is sandwiched by the anode collector foil and the battery cathode electrode layer.

8 Claims, 8 Drawing Sheets

ENERGY STORAGE DEVICE CELL AND CONTROL METHOD THEREOF

CROSS-REFERENCE TO RELATED APPLICATIONS

This application is based upon and claims the benefit of priority from Japanese Patent Application No. 2007-316844, filed Dec. 7, 2007, the entire contents of which are incorporated herein by reference.

BACKGROUND OF THE INVENTION

1. Field of the Invention

The present invention relates to an energy storage device cell with a built-in configuration of a lithium ion capacitor and a lithium ion battery and a control method thereof.

2. Description of the Related Art

Energy storage device cells include electric double layer capacitors, lithium ion batteries, and lithium ion capacitors. An electric double layer capacitor (also simply called a capacitor, a super capacitor, an electrochemical capacitor, or the like, and a lutetium ion capacitor to be described later is also inclusively referred to as a capacitor), is provided with polarizable electrodes (a cathode and an anode) mutually facing across a separator, and makes use of capacitance of an electric double layer to be formed on the surface of the polarizable electrodes in an electrolyte solution.

A lithium ion battery has the advantage of being able to stably charge and store lithium in the carbon anode, and an oxide such as cobalt, nickel, or manganese is used for the cathode.

Moreover, as a new electric double layer capacitor, a lithium ion capacitor has been developed. The lithium ion capacitor is prepared by doping lithium ions in the anode of an electric double layer capacitor, and has a characteristic that the lower limit voltage cannot be lowered to 0V, although a higher upper limit voltage than that of the electric double layer capacitor can be obtained.

The electric double layer capacitor has no such an instantaneous power as in an aluminum electrolytic capacitor, but has an advantage of a large power density and thus being able to charge and discharge in a short time. On the other hand, the lithium ion battery is an energy storage device having an overwhelming energy density, that is, endurance among energy storage devices. If an energy storage device cell having both the instantaneous power of an electric double layer capacitor and the endurance of a lithium battery can be realized, this can be utilized for various applications, such as hybrid automobiles and various types of brake regeneration.

As an energy storage device cell with a built-in structure of an electric double layer capacitor and a lithium ion battery, a parallel connection of an electric double layer capacitor and a lithium ion battery and a mixture of a cathode active material (lithium cobalt oxide) of a lithium ion battery and a cathode material (activated carbon) of an electric double layer capacitor have been disclosed (see JP-A-2001-351688, page 3, FIG. 1, for example).

Also, with regard to the cathode active material of a lithium ion battery, lithium cobalt oxide is generally used, however, because it easily generates heat when short-circuited, and for the purpose of breaking away from a rare metal of cobalt to reduce costs, a method using, as a cathode active material, a mixture of olivine lithium iron phosphate ($LiFePO_4$) and porous carbon and using, as an anode active material, a mixture of spinel lithium titanate ($Li_4Ti_5O_{12}$) and porous carbon has been disclosed (see JP-A-2005-158719, page 4, FIG. 1, for example). It has been disclosed that, in a lithium ion battery thus constructed, a capacitance effect of the mixed porous carbon moderates a decline in voltage in a short time at the time of discharge.

However, in energy storage device cells with the structure where an electric double layer capacitor and a lithium ion battery are connected in parallel or with the structure where a cathode active material of a lithium ion battery and a cathode material of an electric double layer capacitor are mixed, there has been a problem such that, as charging and discharging are repeated, a phenomenon occurs such that, when anions ($PF_6^-$) are released from micropores of the cathode material (activated carbon) of the electric double layer capacitor, lithium ions from the lithium ion battery enter the micropores to oxidatively decompose the solvent and the anions (lithium ions) can no longer exit (pore blockage of activated carbon pores), so that charging and discharging characteristics decline. Particularly, when charging and discharging are repeated at a frequency of less than 10 second intervals or when charging and discharging voltage is raised, there has been a problem such that deterioration in electrical characteristics such as a decline in capacitance and a rise in internal resistance considerably accelerates. It has been discovered that, in either structure described above, opposing reactions to the electrolyte such that, at the time of charging, cations are released from the lithium ion battery, whereas anions are inserted in the electric double layer capacitor, and at the time of discharging, cations are inserted in the lithium ion battery, whereas anions are released from the electric double layer capacitor occur within the same plane or in proximity, and for this reason, deterioration in electrical characteristics is accelerated.

Moreover, although a structure where the anode of an electric double layer capacitor and the anode of a lithium ion battery are separated can also be considered, in such a structure, there has been a problem such that, when such a fast charge and discharge is performed as described above, electrical characteristics are easily deteriorated due to a problem such that the electrochemical potential of the anode of the electric double layer capacitor transiently drops excessively to cause reductive decomposition of the electrolyte solution, and a viscous coating resulting from a decomposition product of the electrolyte solution is produced on the surface of activated carbon particles or gas is generated.

Further, even when an energy storage device cell is constructed by connecting a lithium ion battery using, as a cathode active material, a mixture of olivine lithium iron phosphate ($LiFePO_4$) and porous carbon and using, as an anode active material, a mixture of spinel lithium titanate ($Li_4Ti_5O_{12}$) and porous carbon in parallel with an electric double layer capacitor, or by mixing a cathode active material (lithium cobalt oxide) and a cathode material (activated carbon) of an electric double layer capacitor, there has been a problem such that, opposing reactions to the electrolyte such that anions are released from the electric double layer capacitor, and at the time of discharging, cations are released from the lithium ion battery, whereas anions are absorbed in the electric double layer capacitor occur at proximate places, and for this reason, deterioration in electrical characteristics is accelerated.

SUMMARY OF THE INVENTION

The present invention has been made to solve such problems as described above, and in an energy storage device cell for which an electric double layer capacitor and a lithium ion battery are combined, a charging and discharging reaction at a cathode of the electric double layer capacitor is simplified, while an anode of the electric double layer capacitor is stabilized to thereby provide an energy storage device cell that shows little deterioration in electrical characteristics even after repeating charging and discharging in a short time.

Accordingly, an aspect of the present invention provides an energy storage device cell including: a capacitor cathode including a capacitor cathode collector foil, and a capacitor cathode electrode layer formed on one face of the capacitor cathode collector foil and containing microparticles of activated carbon; a first separator; a common anode including an anode collector foil having a through-hole, and an anode electrode layer formed on one face of the anode collector foil; a second separator; and a battery cathode including a battery cathode collector foil, and a battery cathode electrode layer formed on one face of the battery cathode collector foil and containing particles of a lithium-containing metal compound. The first separator is sandwiched by the capacitor cathode electrode layer and the anode electrode layer. The second separator is sandwiched by the anode collector foil and the battery cathode electrode layer.

The present invention makes it possible to make the common anode including the anode collector foil having the through-hole operate as an anode for the capacitor cathode and battery cathode, and by sandwiching the two separators between the capacitor cathode and battery cathode, these cathodes can be physically remotely separated. By such a configuration, insertion of anions in the capacitor cathode and release of cations from the battery cathode at the time of charging and release of anions from the capacitor cathode and insertion of anions in the battery cathode are completely separated, and a problem that deterioration in electrical characteristics which occurs when a fast charge and discharge is repeated is accelerated, which is caused by opposing reactions to the electrolyte occurring within the same plane or in proximity, is prevented.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION OF THE INVENTION

Embodiment 1

Figure 1:
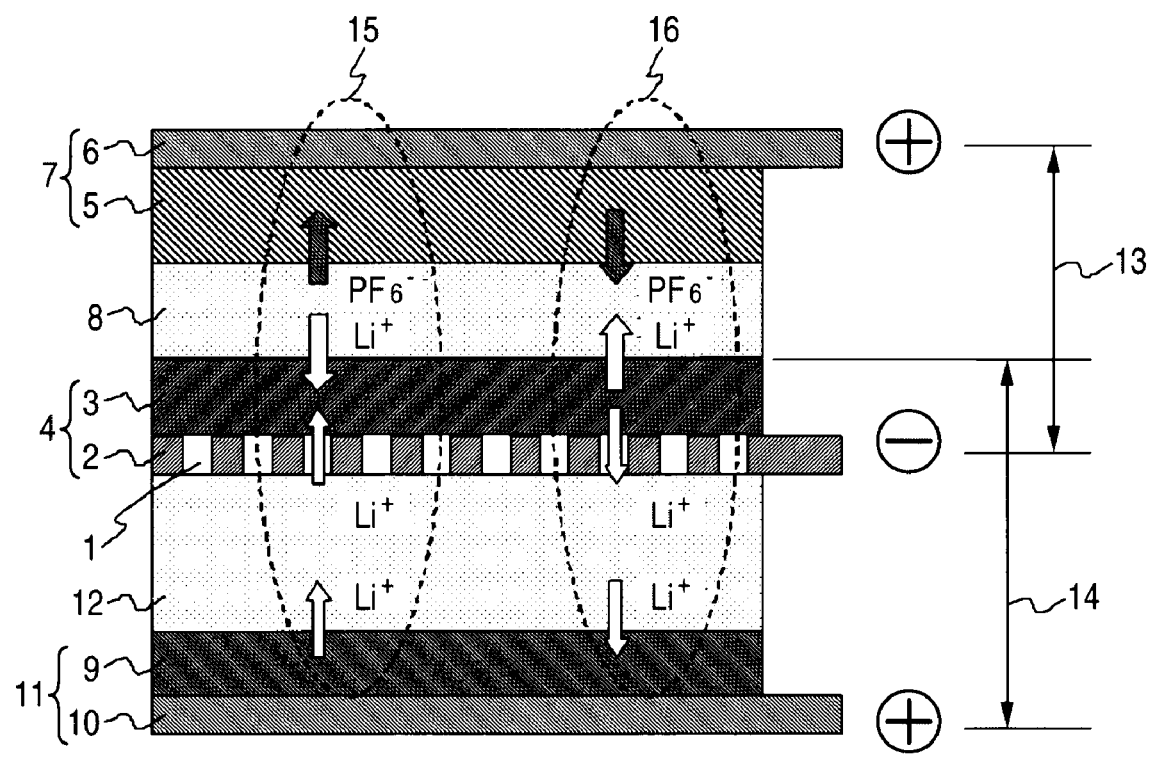
FIG. 1 is a sectional schematic view of an energy storage device cell according to Embodiment 1 of the present invention.

FIG. 1 is a sectional schematic view of an energy storage device cell according to Embodiment 1 for carrying out the present invention. A common anode 4 for which an anode electrode layer 3 is applied to one face of an anode collector foil 2 having through holes 1 and a capacitor cathode 7 for which a capacitor cathode electrode layer 5 containing activated carbon microparticles is applied to a capacitor cathode collector foil 6 are opposed via a first separator 8, and a battery cathode 11 for which a battery cathode electrode layer 9 of lithium ions containing microparticles of a lithium-containing metal compound is applied to a battery cathode collector foil 10 and a face of the anode collector foil 2 applied with no anode electrode layer 3 are opposed via a second separator 12.

The capacitor cathode 7, the first separator 8, and the common anode 4 construct a lithium ion capacitor 13, and the battery cathode 11, the second separator 12, and the common anode 4 construct a lithium ion battery 14. Commonly using the common anode 4 in the lithium ion capacitor 13 and the lithium ion battery 14 and completely separating the capacitor cathode 7 and the battery cathode 11 by the first separator 8 and the second separator 12 are features of the embodiment of the present invention.

As the electrolyte solution, for example, an electrolyte solution prepared by making an organic solvent contain $LiPF_6$ being an electrolyte can be used, and this is shared by the lithium ion capacitor 13 and the lithium ion battery 14. As the organic solvent, for example, propylene carbonate can be used.

As the capacitor cathode collector foil 6 and the battery cathode collector foil 10, an aluminum foil having a thickness of approximately 20 μm, and as the anode collector foil 2, a copper foil of perforated metal, a copper foil of expanded metal, or the like having a thickness of approximately 10 μm formed in advance with through-holes 1 can be used. Alternatively, after the anode electrode layer 3 is formed on a copper foil having a thickness of approximately 10 μm with no through-holes, through-holes may be physically opened in the copper foil by use of a sharp-pointed tool such as a frog. Also, the anode electrode layer 3 may be adhered up to the inside of the through-holes 1 of the anode collector foil 2, and may be adhered up to a face of the anode collector foil 2 that contacts the second separator 12.

As an opening area of the through-hole 1, preferable is 1% to 50% by area with respect to the whole area of the cathode collector foil 2, and further, 5% to 20% by area is desirable. Both ionic conductivity and electrical conductivity can be secured in the range of 1% to 50% by area, and further, in the range of 5% to 20% by area, the ionic conductivity and electrical conductivity become well balanced, and strength of the collector foil can be sufficiently maintained. Changing the opening area results in a change in ion conduction resistance when ions permeate through the through-hole 1, and thus a difference in electrochemical potential between the respective cathodes of the lithium ion capacitor 13 and the lithium ion battery 14 can be controlled, and the more the opening area is reduced, the larger the difference in electrochemical potential between the respective cathodes becomes, so that the electrochemical potential of the lithium ion battery 14 comes to change slowly.

For the first and second separators, porous polyethylene or the like having a thickness on the order of 10 μm to 50 μm, a porosity (voidage) on the order of 60% to 80% by volume, and an average pore diameter of a few to a few tens of micrometers can be used, for example.

As the activated carbon microparticles of the cathode electrode layer 5, microparticles or the like having an average particle diameter of 1 μm to 20 μm, made from a phenolic resin, petroleum pitch, petroleum coke, coconut shell, or the like and applied with steam activation or alkali activation, can be used.

As the microparticles of a lithium-containing metal compound of the battery cathode electrode layer 9, besides olivine lithium iron phosphate ($LiFePO_4$), lithium cobalt oxide ($LiCoO_2$), lithium nickel oxide ($LiNiO_2$), and lithium manganese oxide ($LiMn_2O_4$) can be used. The average particle diameter is desirably on the order of a few micrometers.

As the material of the anode electrode layer 3, carbon microparticles of graphite, hard carbon, amorphous carbon, mesocarbon microbead graphite, and the like that have been used for general lithium ion batteries can be used. The average particle diameter is desirably on the order of 1 μm to 20 μm.

Next, operations of the lithium ion capacitor 13 and the lithium ion battery 14 according to the present embodiment will be described. In FIG. 1, an ion movement at the time of charging will be described by a part surrounded by a broken-line oval 15 at the left side. Also, an ion movement at the time of discharging becomes opposite to the time of charging, which is shown by a part surrounded by a broken-line oval 16 at the right side.

First, description will be given of the ion movement at the time of discharging. Since the electrolyte is $LiPF_6$, as reactions in the lithium ion capacitor 13, $Li^+$ cations enter micropores of the carbon particles and an interlayer of carbon particles to form an electric double layer in the anode electrode layer 3, and $PF6^-$ anions are incorporated in nanometer-level mesopores or micropores of the activated carbon microparticles to form an electric double layer in the capacitor cathode electrode layer 5, and thus electricity is accumulated by a serial connection of the two electric double layers of the anode and cathode.

On the other hand, as reactions in the lithium ion battery 14, since the electrolyte is $LiPF_6$, in the anode electrode layer 3, $Li^+$ cations are intercalated in the particle surface of carbon particles or an interlayer between carbon layers existing inside and neutralized by being added with electrons by the carbon to be stabilized, and in the battery cathode electrode layer 9, $Li^+$ cations generated as a result of abstraction of electrons from lithium-containing metal oxide particles are released into the electrolyte solution to accumulate electricity.

In the anode electrode layer 3, by the electric double layer-forming reaction of the lithium ion capacitor, $Li^+$ cations merely approach the carbon layers of carbon particles, whereas in the anode reaction of the lithium ion battery, $Li^+$ cations are intercalated in an interlayer between the carbon layers of carbon particles and stored one after another. As described above, the reactions are similar at first glance, but strictly, these differ in phenomena.

In the present embodiment, the lithium ion capacitor (hereinafter, described as an LIC) and the lithium ion battery (hereinafter, described as an LIB) are electrically connected in parallel, and thus, when a fast charge and discharge is performed, as a matter of course, a reaction that electricity once accumulated in the LIC is released into the LIB occurs. If the LIC anode and the LIB anode are not a common electrode of the present embodiment but electrodes each having an electrode layer, $Li^+$ cations are released from the anode of the LIC and the $Li^+$ cations are absorbed in the anode of the LIB. However, providing the LIC anode and the LIB anode as a common electrode as in the present embodiment makes it unnecessary to again absorb $Li^+$ cations after once releasing $Li^+$ cations, and it suffices to simply change an adsorption state of $Li^+$ cations in the capacitor into a state of $Li^+$ cations of the stabilized anode of the lithium ion battery. More likely than not, this is considered to be a difference to such an extent to change the degree of intercalation of $Li^+$ cations in an interlayer between the carbon layers of carbon particles.

More specifically, in the common anode of the present embodiment, an electrical migration from the LIC to the LIB can be very simply realized, and thus involves virtually no energy loss. This is an effect that cannot be obtained by a conventional configuration where the LIC anode and the LIB anode are independent.

In the case of discharging, the ion movement is merely reversed from that at the time of charging, and if the LIC anode and the LIB anode are not a common electrode of the present embodiment, $Li^+$ cations are released from the anode of the LIB and the $Li^+$ cations are absorbed in the anode of the LIC. However, providing the LIC anode and the LIB anode as a common electrode as in the present embodiment makes it unnecessary to again absorb $Li^+$ cations after once releasing $Li^+$ cations, and it suffices to simply change the state of $Li^+$ cations of the stabilized anode of the LIB into an adsorption state of $Li^+$ cations in the LIC. This is considered, in this case as well, as at the time of charging, to be more than likely a difference to such an extent to change the degree of intercalation of $Li^+$ cations in an interlayer of carbon.

Thus, in the present embodiment, by constructing the anodes of the LIB and LIC as a common anode, the electrochemical potential of the common anode is maintained in an extremely stable state, and this effect allows preventing such a phenomena that the electrochemical potential of the common anode transiently drops excessively to cause reductive decomposition of the electrolyte solution or precipitation of metal lithium.

On the other hand, as to reactions at the cathode, the LIC and LIB are completely independent, and the electrode layers are also physically separated and the collector foils are also separate members, so that ion movements are independent and thus never interfere even when the LIC and LIB are electrically connected in parallel.

In contrast thereto, when, as in a conventional energy storage device cell, cathode activated carbon microparticles of a lithium ion capacitor and lithium-containing metal oxide microparticles of a lithium ion battery are mixed to form a common electrode layer, ion movements are complicated. Since the cathode activated carbon microparticles are superior in electron conductivity to the lithium-containing metal oxide microparticles, electrons that flow to the lithium-containing metal oxide microparticles also flow via the cathode activated carbon microparticles, and in conjunction with ion flows, an extremely complex local electrochemical potential is generated. Particularly, an increase in local electrochemical potential to be generated when a fast charge and discharge is performed is prominent, and when cathode activated carbon microparticles of a lithium ion capacitor and lithium-containing metal oxide microparticles of a lithium ion battery are mixed to form a common electrode layer, deterioration occurs in a short time due to gas generation and the like. This is because a movement of $Li^+$ cations is in an opposite direction to a movement of $PF6^-$ anions, and when electricity migrates from the LIC to the LIB, this becomes a movement in the same direction. It is expected that, due to such an ion movement, propylene carbonate being an organic solvent acting as a lubricant is sandwiched by ions and oxidatively decomposed to swell, and the swollen organic solvent causes pore blockage of mesopores or micropores of the activated carbon microparticles in the cathode, which results in an increase in internal resistance and a decline in capacitance and leads to gas generation resulting from decomposition of the solvent.

More specifically, in the present embodiment, completely independent reactions at the cathode of the lithium ion capacitor and the cathode of the lithium ion battery have been achieved, and thus it is considered that even repeating a fast charge and discharge does not lead to deterioration.

Figure 2:
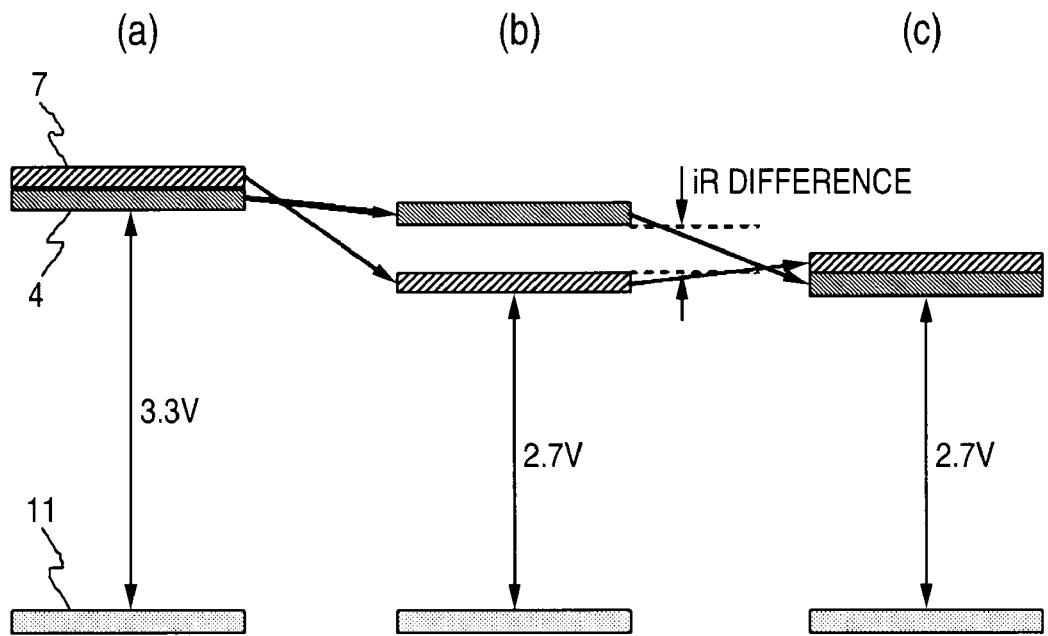
FIG. 2 is characteristic diagram of the energy storage device cell according to Embodiment 1 of the present invention.
Figure 3:
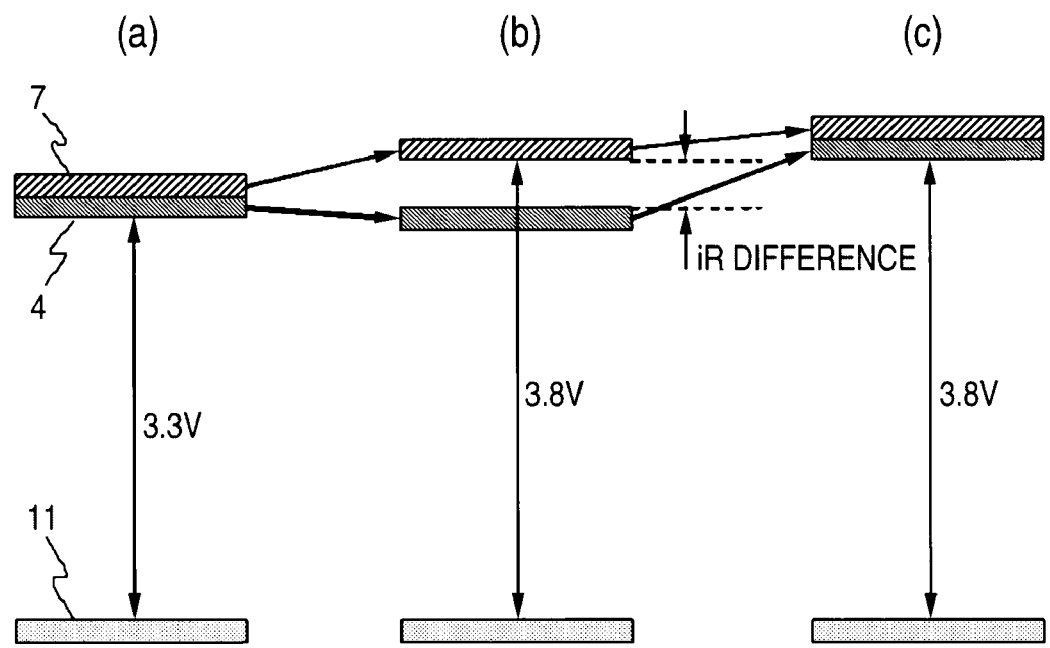
FIG. 3 is characteristic diagram of the energy storage device cell according to Embodiment 1 of the present invention.

Effects of the energy storage device cell according to the present embodiment will be more clearly described. FIG. 2 and FIG. 3 are characteristic diagrams showing potentials of the capacitor cathode (described as an LIC cathode in FIGS. 2 and 3) and the battery cathode (described as an LIB cathode in FIGS. 2 and 3) of the energy storage device cell according to the present embodiment. In FIG. 2, (a) is an electrochemical potential diagram in a charge steady state, (c) is an electrochemical potential diagram in a discharge steady state, and (b) is an electrochemical potential diagram in a transient state. Similarly, in FIG. 3, (a) is an electrochemical potential diagram in a discharge steady state, (c) is an electrochemical potential diagram in a charge steady state, and (b) is an electrochemical potential diagram in a transient state.

Referring to FIG. 2, description will be given of a change in potential from a charge steady state to a discharge steady state of the respective electrodes of the energy storage device cell according to the present embodiment. In the charge steady state, the LIC cathode and the LIB cathode are electrically connected in parallel, and connected via an electrolyte solution to thus result in the same electrochemical potential. However, in the transient state, a gap occurs in the electrochemical potential by a difference in electrical resistance. The electric double layer capacitor has an extremely low internal resistance in principle, but internal resistance of the lithium ion battery is greater than that of the electric double layer capacitor. The major cause is that the material of the cathode electrode layer of the lithium ion battery is a lithium-containing metal oxide poor in electron conductivity. By a fast discharge in the transient state, a charge is released from the electric double layer capacitor having a smaller internal resistance, so that in the lithium ion battery, electrochemical potential of the LIC cathode declines by a difference (iR difference) in electrochemical potential from the electric double layer capacitor. Thereafter, a charge to be released from the electric double layer capacitor is reduced, so that a charge comes to be released from the lithium ion battery, potential of the LIC cathode gradually falls, the charge partially migrates from the lithium ion battery to the electric double layer capacitor, and thus in the discharge steady state, the potential of the LIC cathode and the potential of the LIB cathode are coincident.

Also, here, i represents a current that flows from the lithium ion battery to the electric double layer capacitor, and R represents an internal resistance such as an ion conduction resistance between the lithium ion battery and electric double layer capacitor.

Next, referring to FIG. 3, description will be given of a change in potential from a discharge steady state to a charge steady state of the respective electrodes of the energy storage device cell according to the present embodiment. In the discharge steady state as well, the LIC cathode and the LIB cathode are electrically connected in parallel, and connected via an electrolyte solution to thus result in the same electrochemical potential. However, in the transient state, a gap still occurs in the electrochemical potential by a difference in electrical resistance. By a fast charge in the transient state, a charge is accumulated in the electric double layer capacitor having a smaller internal resistance, so that electrochemical potential of the LIC cathode declines by a difference (iR difference) in electrochemical potential between the lithium ion battery and the electric double layer capacitor. Thereafter, a charge to flow into the electric double layer capacitor is reduced, so that a charge comes to flow into the lithium ion battery, potential of the LIC cathode gradually rises, the charge accumulated in the electric double layer capacitor also partially migrates to the lithium ion battery, and thus in the charge steady state, the potential of the LIC cathode and the potential of the LIB cathode are coincident.

It is desirable that the average pore diameter of the second separator 12 is larger than the average pore diameter of the first separator 8, and this facilitates movement of the electrolyte solution in the in-plane direction of the second separator 12, and allows speedily eliminating a concentration distribution of lithium ions in the in-plane direction of the energy storage device cell. When a distribution of lithium ion concentration occurs in the in-plane direction, there is a possibility that parts with insufficient or excessive lithium ions are locally produced, the electrometrical potential of the anode and cathode transiently fluctuates due to the local distribution of lithium ion concentration, and deterioration occurs at the anode and cathode in a short time.

Moreover, as the material of the second separator, olefinic porous paper of polyethylene, polypropylene, or the like that melts at 200° C. or less is desirable, and in the case of an abnormality such as an electrical short circuit, the second separator melts due to heat generated by a short-circuit current thereof to block the through-holes 1 of the anode collector foil 2, which allows stopping the reaction in the lithium ion battery.

As the first separator, for example, TF40, a separator paper for an electric double layer capacitor, manufactured by NIPPON KODOSHI CORPORATION, can be used, and as the second separator, for example, a polypropylene-made porous film (polypropylene nonwoven fabric (MPF 45AC: NIPPON KODOSHI CORPORATION)) having a thickness of 0.3 mm can be used. TF40 is made of solvent-spun regenerated cellulose fibers, has an average pore diameter of approximately 0.3 µm, and a porosity of 73% by volume. MPF 45AC is made of polypropylene fibers, has an average pore diameter of approximately 4 µm, and a porosity of 75% by volume. The larger the average pore diameter, the more movement of the electrolyte solution in the in-plane direction of the energy storage device cell is facilitated.

Although, in the embodiment of the present invention, propylene carbonate containing $LiPF_6$ has been used as an electrolyte solution, another material, for example, as the electrolyte, a material containing Li such as $LiBF_4$ can be used in place of $LiPF_6$, and as the electrolyte solution, one of the group consisting of propylene carbonate, ethylene carbonate, dimethyl carbonate, diethyl carbibate, dimethoxyethane, diethoxyethane, γ-butyrolactone, acetonitrile, and propionitrile or a mixed solvent of the two of these can also be used.

Moreover, although porous polyethylene has been used as the first and second separators, as other materials, olefinic porous papers of polypropylene or the like, nonwoven fabrics containing celluloses such as natural pulp, natural cellulose, solvent-spun cellulose, and bacterial cellulose, glass fibers, and non-fibrillated organic fibers, and fibrillated films or porous films of aromatic polyamide, wholly aromatic polyamide, aromatic polyester, wholly aromatic polyester, wholly aromatic polyester amide, wholly aromatic polyether, wholly aromatic polyazo compound, polyphenylene sulfide (PPS), poly(p-phenylene benzobisthiazole) (PBZT), poly(p-phenylene benzobisoxazole) (PBO), polybenzimidazole (PBI), polyether ether ketone (PEEK), polyamide-imide (PAI), polyimide, polytetrafluoroethylene (PTFE), and the like, etc., can be used. Various materials can also be mentioned in terms of the porosity and average pore diameter, and even the same material can be simply modified according to the weight per unit area and density.

Embodiment 2

In Embodiment 2, characteristics of the energy storage device cell obtained in Embodiment 1 are compared with the characteristics of a conventional lithium ion battery.

Figure 4A:
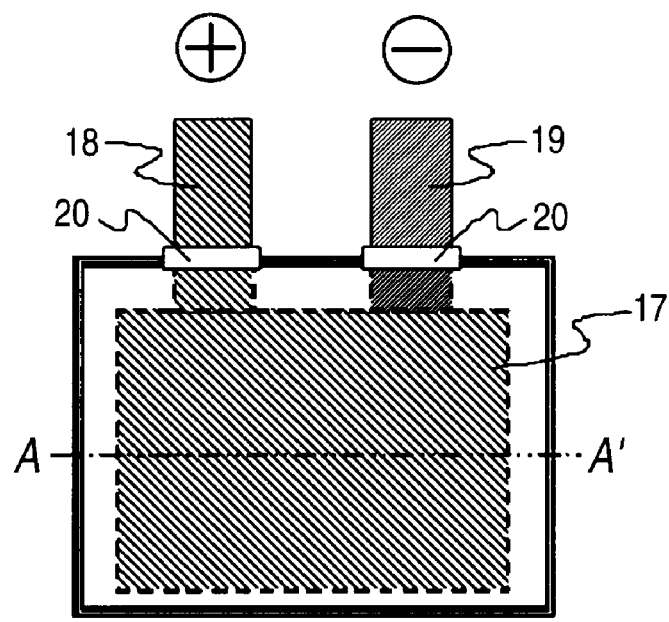
FIGS. 4A and 4B are a plan schematic view and a sectional schematic view of an energy storage device cell according to Embodiment 2 of the present invention.
Figure 4B:
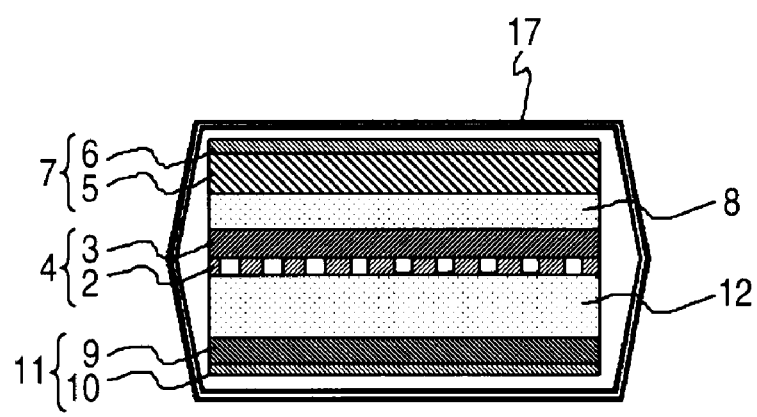

FIG. 4A is a plan schematic view of the energy storage device cell according to the present embodiment and FIG. 4B is a sectional schematic view along A-A'. In FIGS. 4A and 4B, activated carbon (steam activated carbon) having an average particle diameter of 5 μm, an SBR binder, ammonium CMC (a thickener), and carbon black (an electrical conductor) were mixed into water to be a paste, and the paste was applied by means of a doctor blade on the surface of an aluminum foil having a thickness of 20 μm serving as a capacitor cathode collector foil 6 so as to become a capacitor cathode electrode layer 5, dried, and then pressed to form a capacitor cathode 7. The thickness of the capacitor cathode electrode layer 5 after pressing was provided as 100 μm.

Although a battery cathode 11 was fabricated by the same method as for the capacitor cathode, as a paste to fabricate a battery cathode electrode layer 9, one prepared by mixing olivine lithium iron phosphate (LiFePO$_4$) powder (Hohsen Corporation: trial product), carbon black (an electrical conductor), and poly(vinylidene fluoride) (PVdF, a binder) and adding thereto N-methyl-2-pyrrolidone (NMP) to be a paste was used. In addition, the thickness of the battery cathode electrode layer was provided as 50 μm.

For a common anode, a copper foil having a thickness of 18 μm and with perforations of a 60-degree staggered arrangement (with a circle diameter of 2 mm and a pitch of 5 mm) was used as an anode collector foil 2. The opening ratio was 14% by area. Graphite particles having an average particle diameter of 5 μm, a BR binder, ammonium CMC (a thickener), and carbon black (an electrical conductor) were mixed into water to be a paste, and the paste was applied by means of a doctor blade on the surface of the anode collector foil 2 so as to become an anode electrode layer 3, dried, and then pressed to form a common electrode 4. The thickness of the anode electrode layer 3 after pressing was provided as 50 μm.

As a first separator 8, TF40, a separator paper for an electric double layer capacitor, manufactured by NIPPON KODOSHI CORPORATION, was used, and as a second separator 12, a polypropylene-made porous film (polypropylene nonwoven fabric (MPF 45AC: NIPPON KODOSHI CORPORATION)) having a thickness of 0.3 mm was used.

The capacitor cathode 7, the first separator 8, the common anode 4, the second separator 12, and the battery cathode 11 were placed one upon another, dried in a vacuum at 180° C., and then placed inside an aluminum laminated container 17, and an electrolyte solution was filled in the aluminum laminated container 17 for impregnation. As the electrolyte solution, one prepared by dissolving, in a mixed solvent of ethylene carbonate and diethyl carbonate mixed at a volume ratio of 1:1, a fluorine-containing electrolyte salt of LiPF$_6$ at a concentration of 1 mol/l was used.

A current terminal portion (not shown) of the capacitor cathode collector foil 6 and a current terminal portion (not shown) of a battery cathode collector foil 10 were ultrasonically welded together with an external cathode terminal 18 of an aluminum plate having a thickness of 0.2 mm, and a current terminal portion (not shown) of the common anode collector foil 2 was ultrasonically welded to an external anode terminal 19 for which a copper plate having a thickness of 0.1 mm was nickel-plated. The external cathode material 18 and the external anode terminal 19 were sealed by melting a polyethylene-made sealant 20 and integrating the same with the aluminum laminated container 17. An energy storage device cell of the present embodiment was thus completed. Also, an effective cell area (the size of the cathode and anode contributing to reactions) of the energy storage device cell is 9 cm$^2$ (30 mm×30 mm).

As the lithium ion battery for a comparison with the energy storage device cell of the present embodiment, one with a structure excluding, from the present embodiment, the capacitor cathode and the first separator was fabricated. Also, for an anode of the lithium ion battery for a comparison, a metal foil with no through-holes was used, and the effective cell area is the same.

Figure 5:
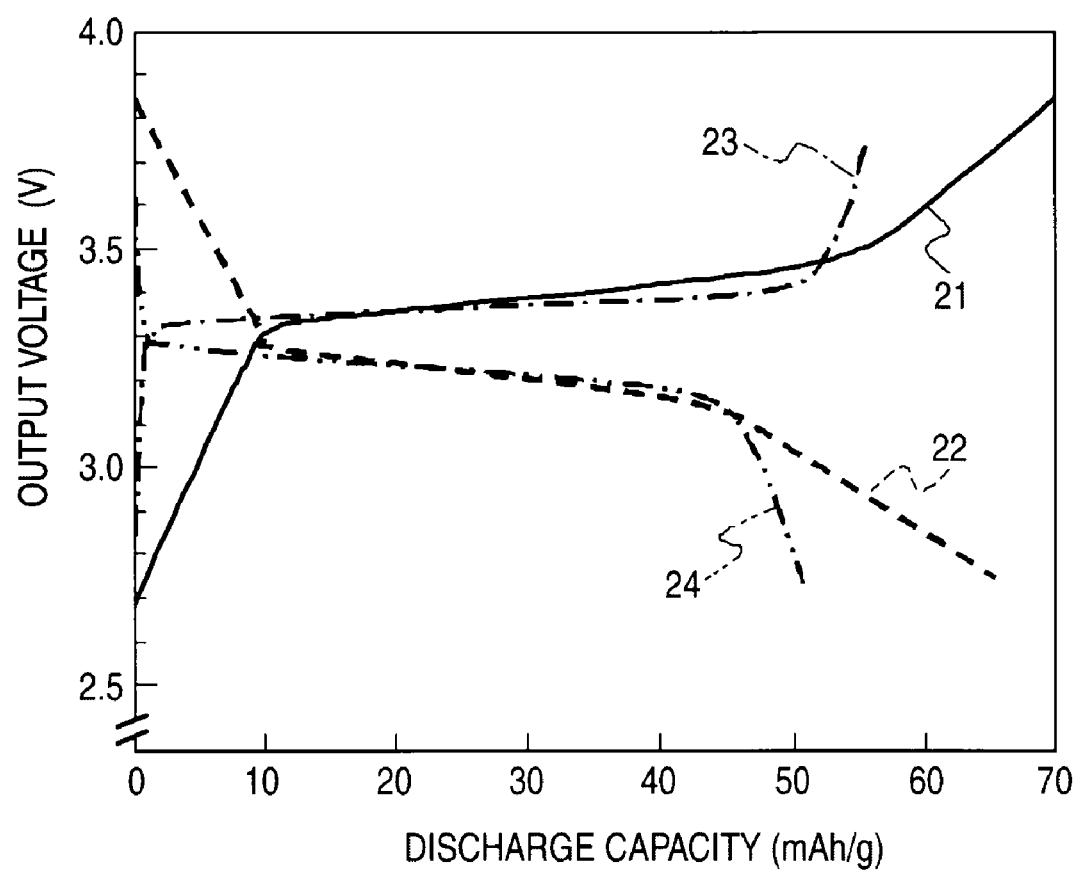
FIG. 5 is a characteristic diagram of the energy storage device cell according to Embodiment 2 of the present invention.

FIG. 5 is a characteristic diagram showing charging and discharging characteristics of the energy storage device cell according to the present embodiment and the lithium ion battery for a comparison. In FIG. 5, the horizontal axis shows discharge capacity, the vertical axis shows output voltage, and charging capacities and discharging capacities obtained when testing was performed with the energy storage device cell according to the present embodiment and the lithium ion battery for a comparison are shown with as-is values. The characteristics shown in FIG. 5 are all 10-hour rates, that is, measurements of a charging capacity or a discharging capacity when 10-hour charging or 10-hour discharging was performed at 1.5 mA, and were measured at a constant temperature of 25° C. Since a measurement condition for this is a slow charge and discharge of 0.1 C, the capacity to be charged or discharged in and from the lithium ion battery can be accurately determined. Moreover, a change in capacity according to a change in voltage occurs in the electric double layer capacitor. In FIG. 5, a solid line 21 and a broken line 22 show a charging characteristic and a discharging characteristic of the energy storage device cell of the present embodiment, respectively, and an alternate long and short dashed line 23 and an alternate long and two short dashed line 24 show a charging characteristic and a discharging characteristic of the lithium ion battery for a comparison, respectively.

It can be understood from the charging characteristic 21 and the discharging characteristic 22 of the energy storage device cell of the present embodiment that there is apparently a capacitance component in a charge and discharge up to 2 mAh, and in response to an instantaneous charge and discharge, the capacitor part has been first charged. This shows that a sudden rise (the time of charging) and a sudden fall (the time of discharging) in voltage of the energy storage device cell have been prevented, and the instantaneous power of the electric double layer capacitor and the endurance of the lithium ion battery have been combined.

On the other hand, in the lithium ion battery for a comparison, from the charging characteristic 23 and the discharging characteristic 24 thereof, no capacitance component (charging characteristic 23) at an initial stage or an end stage of charging or capacitance component (discharging characteristic 24) at an initial stage of discharging has been observed.

Further, a cycle test for repeating a charge and discharge of 2.8V to 3.7V was conducted at one minute intervals, using the energy storage device cell of the present embodiment and the lithium ion battery for a comparison, at 70° C., as a deterioration-accelerating cycle life testing.

Figure 6:
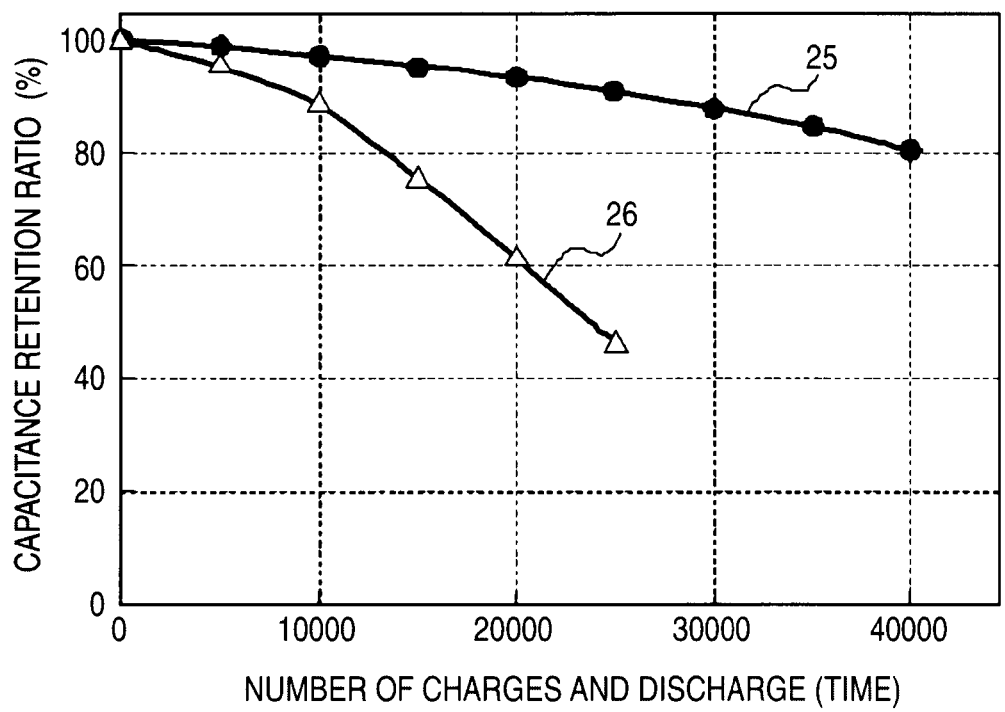
FIG. 6 is a characteristic diagram of the energy storage device cell according to Embodiment 2 of the present invention.

FIG. 6 is a life characteristic diagram of the energy storage device cell according to the present embodiment and the lithium ion battery for a comparison. In FIG. 6, the horizontal axis shows the number of charges and discharges, the vertical axis shows the retention ratio of capacitance to initial capacitance, a life curve 25 shows the capacitance retention ratio of the energy storage device cell, and a life curve 26 shows the capacitance retention ratio of the lithium ion battery for a comparison. In FIG. 6, when the numbers of charges and discharges when the capacitance retention ratio became 80% were compared, the energy storage device cell (life curve 25) of the present embodiment showed approximately 40,000 times, whereas the lithium ion battery for a comparison (life curve 26) showed approximately 13,000 times. Thus, it has been discovered that the life of the energy storage device cell of the present embodiment has been prolonged approximately three times as long as that of the lithium ion battery for a comparison.

Figure 7:
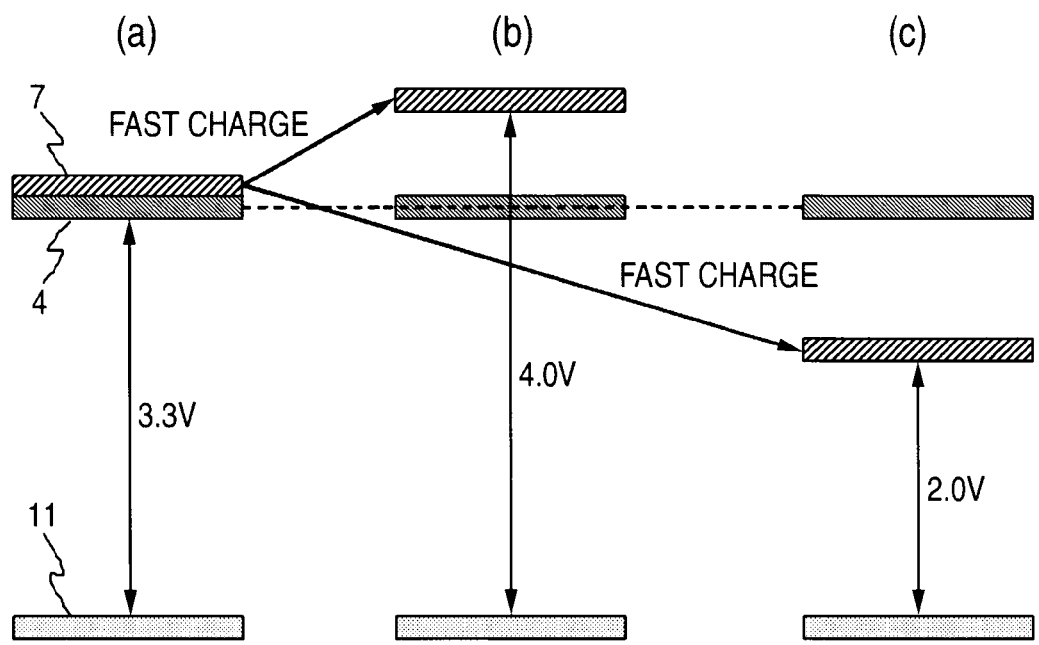
FIG. 7 is characteristic diagram of the energy storage device cell according to Embodiment 2 of the present invention.

FIG. 7 is a characteristic diagram showing potentials of the capacitor cathode and the battery cathode at the time of a fast charge and discharge of the energy storage device cell according to the present embodiment. In FIG. 7, (a) is an electrochemical potential diagram in a steady state, (b) is an electrochemical potential diagram in a fast charging state, and (c) is an electrochemical potential diagram in a fast discharging state.

A stable voltage of $LiFePO_4$ is on the order of 3.3V, and the lithium ion capacitor is capable of fast charging and discharging if it is from 2.0V to 4.0V Accordingly, it is desirable to perform control at an upper limit voltage of 4.0V and a lower limit voltage of 2.0V while providing 3.3V as a rated voltage.

In the electric double layer capacitor, the stored energy reaches $\frac{1}{2}CV^2$, and thus if, for example, C=200 F, an energy difference between 3.3V and 4.0V equals 511 J, which is a difference between $(\frac{1}{2}) \times 200\,F \times (3.3V)^2 = 1089$ J and $(\frac{1}{2}) \times 200\,F \times (4.0V)^2 = 1600$ J, an energy difference between 3.3V and 2.0V equals 700 J in the same manner. That is, for the fast charging side, a quantity of electricity of 511 J can be accumulated, and for the fast discharging side, a quantity of electricity of 700 J can be released. In such a case that a cyclic fast charge and discharge is repeated, the quantity of fast-charge electricity and the quantity of fast-charge electricity become almost equal, and thus with respect to the rated voltage, an upper limit voltage and a lower limit voltage that reach equally higher and lower amounts of energy exist. If the upper limit voltage is below 4.0V and the lower limit voltage is over 2.0V, control without a possibility to deteriorate the cathode and anode of the lithium ion capacitor can be maintained. In the case of FIG. 2 and FIG. 3, a difference between 3.3V and 3.8V and a difference between 2.7V and 3.3V become almost equal in energy, and if a fast charge from 3.3V to 3.8V and a fast discharge from 3.3V to 2.7V are provided as design values, a cathode voltage of $LiFePO_4$ can be stably used. In the case of $LiFePO_4$, a range of 3.1V to 3.5V is desirable. However, the rated voltage varies depending on the amount of the conductor etc., to be added to $LiFePO_4$. Moreover, one improved in electron conductivity by using a compound prepared by substituting some of Fe with another element such as Nb or Mn can also be used, and in that case as well, an optimal rated voltage varies. However, the upper limit voltage in charging and discharging control is desirably 4.0V, and the lower limit voltage, 2.0V, from the viewpoint of preventing deterioration of the lithium ion capacitor.

Such a control method for the energy storage device cell is a control method suitable for $LiFePO_4$ having a lower voltage than the allowable voltage of an electric double layer capacitor, and in the case of, for example, lithium ion batteries using lithium cobalt oxide ($LiCoO_2$) and lithium manganese oxide ($LiMn_2O_4$) for the cathode active materials, which have been widely used as power sources for mobile phones and personal computers, since a stable voltage is 4.0V or more, there is almost no excess at the charging side when the lithium ion batteries are combined with electric double layer capacitors. That is, although a sufficient voltage can be secured for a fast discharge in FIG. 7, a fast charge cannot be performed since there is no voltage excess for a fast charge. Accordingly, when a lithium ion secondary battery of lithium cobalt oxide or the like whose stable voltage is higher than 4V is used, it is difficult to use the same for the application of a fast charge, and an application for dealing with a fast discharge is desirable, and as in, for example, voltage sag compensators that compensate for the influence of lightning and the like, which rapidly spread for the application as capacitors, in the case of an application of fast discharging for compensation for the frequency and waveform while usually in a charging state, the configuration of the embodiment of the present invention can be used. It is apparent from the above results that both a fast charge and discharge and endurance have been realized by the energy storage device cell of the present embodiment, and the life performance has also been improved.

Also, an electrical insulating coating may be provided on the anode collector foil facing the second separator, and this has an effect of more completely preventing an electrical short circuit in the configuration of the lithium ion battery. As the insulating coating, for example, an enamel coating can be used. The enamel coating is normally a coating by a polyimide resin, but, for an improvement in heat resistance, this may contain silica microparticles on the order of 0.1 µm. In addition, insulating varnish may be used if this is not soluble in the electrolyte solution. The insulating coating to be provided on the anode collector foil desirably has a thickness on the order of 10 µm, and may be formed before forming or after forming the anode electrode layer. Forming an insulating coating on the anode copper foil facing the second separator allows, even if the microparticles of the battery cathode electrode layer migrate via the separator and reach the anode collector foil, preventing a short circuit by the insulating coating, and thus the thickness of the second separator can be reduced to lower the ion conduction resistance of the lithium ion battery, so that a loss due to charging and discharging can be minimized.

Embodiment 3

Figure 8A:
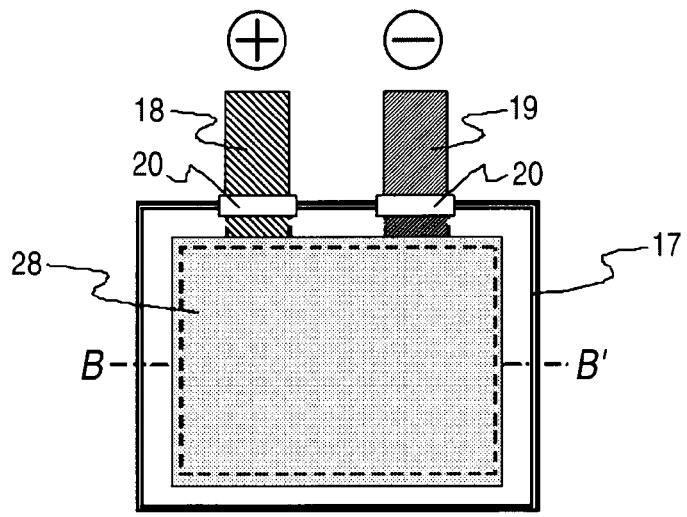
FIGS. 8A and 8B are a plan view and a sectional schematic view of an energy storage device cell according to Embodiment 3 of the present invention.
Figure 8B:
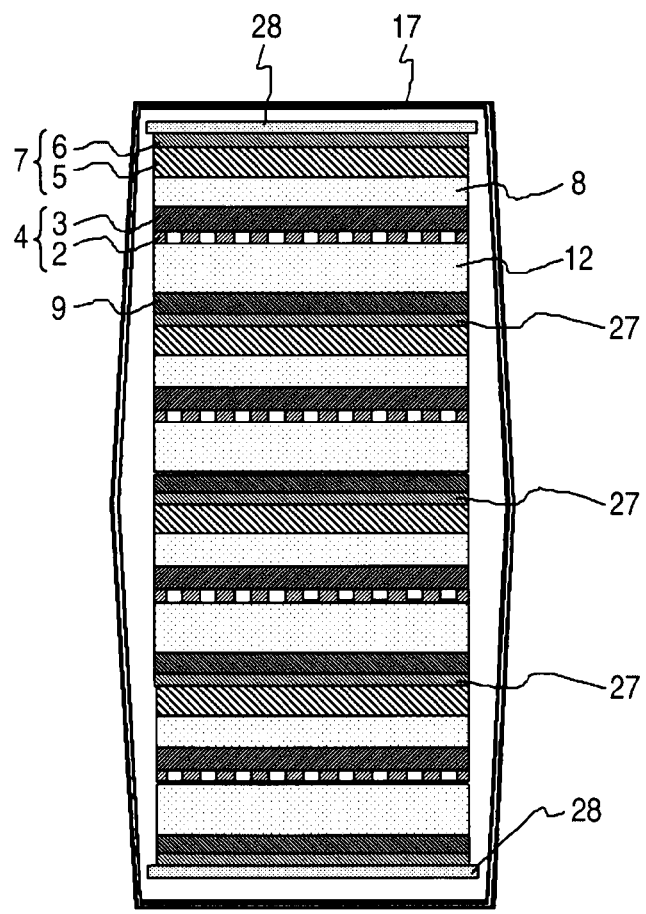

FIG. 8A is a plan view of an energy storage device cell according to Embodiment 3 of the present invention and FIG. 8B is a sectional schematic view along B-B'. In the present embodiment, four combinations of the paired electric double layer capacitor and lithium ion battery of Embodiment 1 are placed one upon another. In FIGS. 8A and 8B, the capacitor cathode collector foil and the battery cathode collector foil in a laminated part are formed by a single common cathode collector foil 27. Further, in a laminated uppermost portion and lowermost portion, an electrical insulating sheet 28 is arranged between the aluminum laminated container 17 and the capacitor cathode collector foil and battery cathode collector foil. For the electrical insulating sheet 28, polyethylene terephthalate having a thickness of approximately 0.2 mm can be used, for example.

In the energy storage device cell thus constructed, since four combinations of the paired electric double layer capacitor and lithium ion battery have been laminated via the common cathode collector foils, an effect of improving energy density can be obtained. Moreover, the electrical insulating sheets have been inserted for avoiding direct contact of the capacitor cathode collector foil and battery cathode collector foil with the aluminum laminated container. Although an aluminum laminated film itself of the aluminum laminated container has been applied with an electrical insulating treatment by a surface treatment, if the surface is damaged, short-circuiting with the cathode collector foil may occur. The aluminum laminated container has the possibility that the surface is damaged to be short-circuited even at the outside, and thus arranging the electrical insulating sheet also provides an effect of preventing the cathode collector foil from being short-circuited.

Embodiment 4

Figure 9:
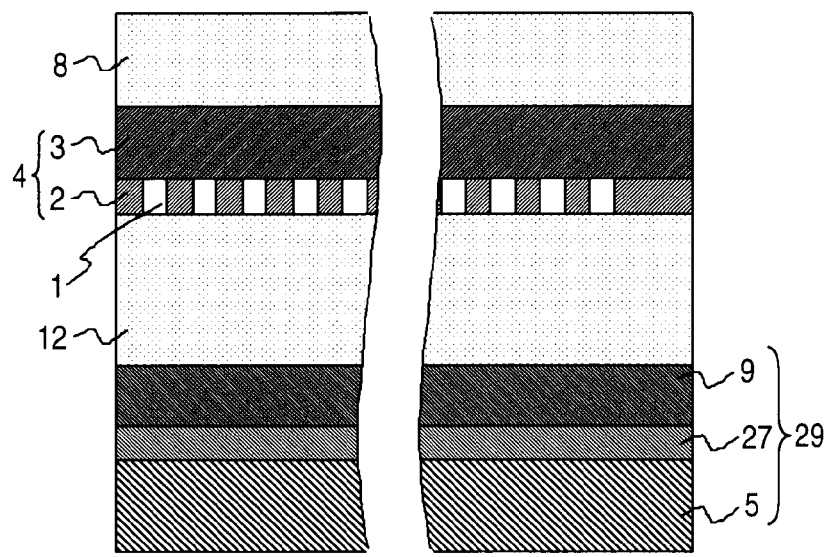
FIG. 9 is a sectional schematic view of an energy storage device cell according to Embodiment 4 of the present invention.

FIG. 9 is a sectional schematic view of members that form an energy storage device cell according to Embodiment 4 of the present invention. In the present embodiment, a combination of the paired electric double layer capacitor and lithium ion battery of Embodiment 1 is wound. In FIG. 9, a common cathode electrode collector foil 27 is placed on a capacitor cathode electrode layer 5, and further thereon, a battery cathode electrode layer 9, a second separator 12, an anode collector foil 2, an anode electrode layer 3, and a first separator 8 are laminated in order. The capacitor cathode electrode layer 5, the common electrode collector foil 27, and the battery cathode electrode layer 9 form a common cathode 29, and the anode collector foil 2 and the anode electrode layer 3 form a common anode 4. These electrodes and separators show a belt shape having a width of approximately 3 cm and a length of approximately 3 m.

Figure 10:
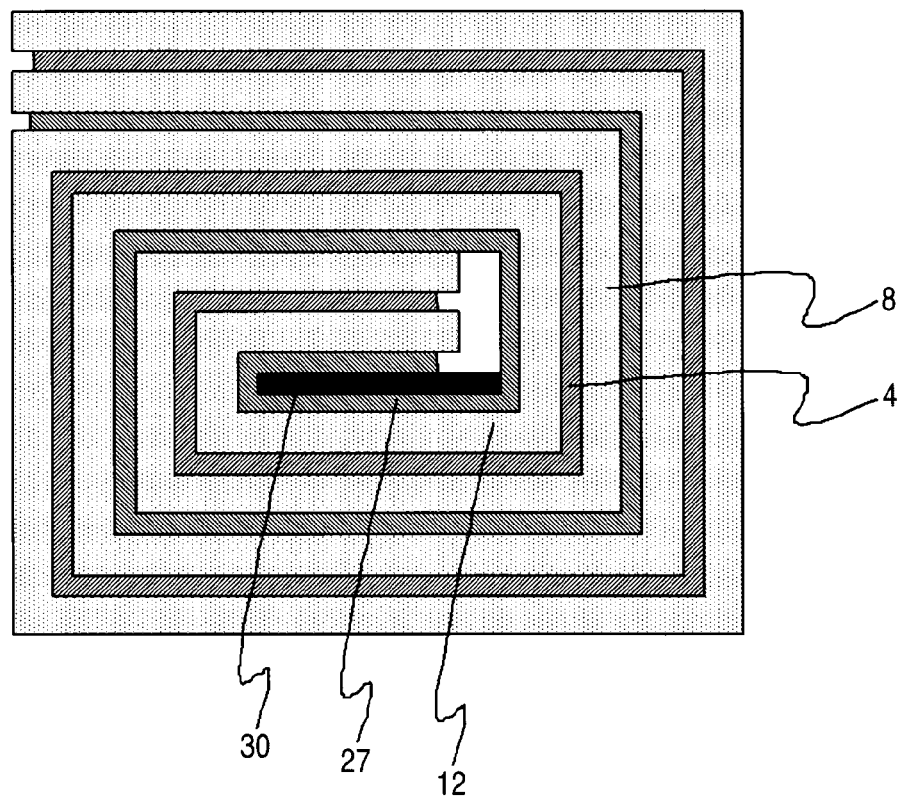
FIG. 10 is a sectional schematic view of the energy storage device cell according to Embodiment 4 of the present invention.

FIG. 10 is a sectional schematic view of the energy storage device cell of the present embodiment. The belt-like laminate shown in FIG. 9 is wound around a core member 30 with the common electrode 29 being made to contact the core member 30, whereby an energy storage device cell of the present embodiment is constructed. As the core member 30, a flat plastic or the like can be used.

In the energy storage device cell thus constructed, there is an effect of improving energy density as in Embodiment 3, and the energy storage device cell can be manufactured at a lower cost than in Embodiment 3.

Embodiment 5

Figure 11:
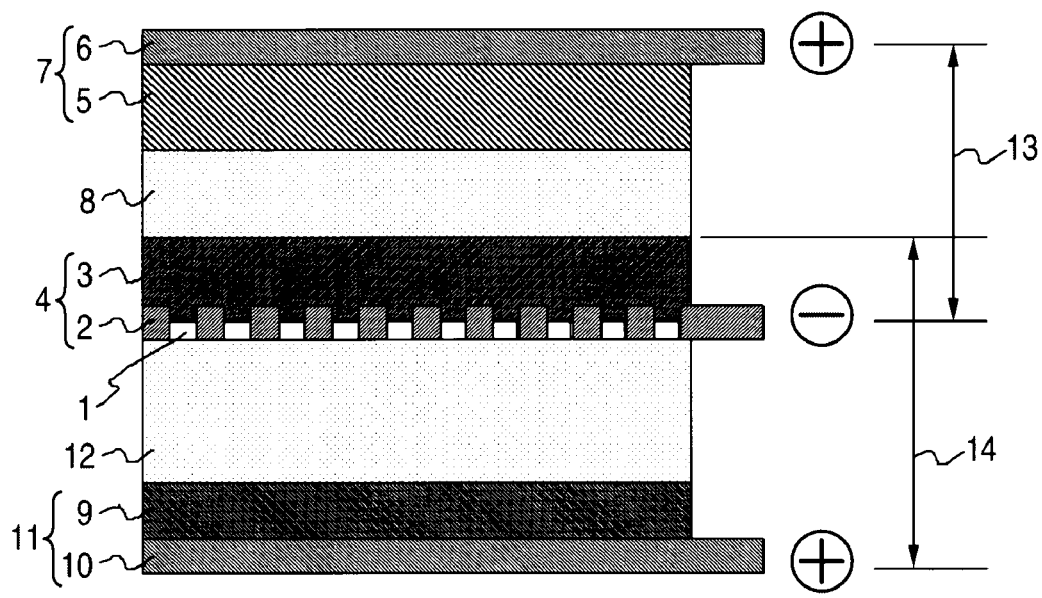
FIG. 11 is a sectional schematic view of an energy storage device cell according to Embodiment 5 of the present invention.

FIG. 11 is a sectional schematic view of an energy storage device cell according to Embodiment 5 of the present invention. Embodiment 5 differs from Embodiment 1 in the anode electrode layer 3, which has intruded up to the inside of the through-holes 1 provided in the anode collector foil 2. When the anode electrode layer 3 is applied using, for example, screen printing on the anode collector foil 2 provided in advance with the through-holes 1, such a phenomenon that the anode electrode layer 3 intrudes up to the inside of the through-holes 1 is likely to occur.

It has been confirmed that in such a configuration as well, the same charging and discharging characteristics as in Embodiment 1 can be obtained.

Embodiment 6

Figure 12:
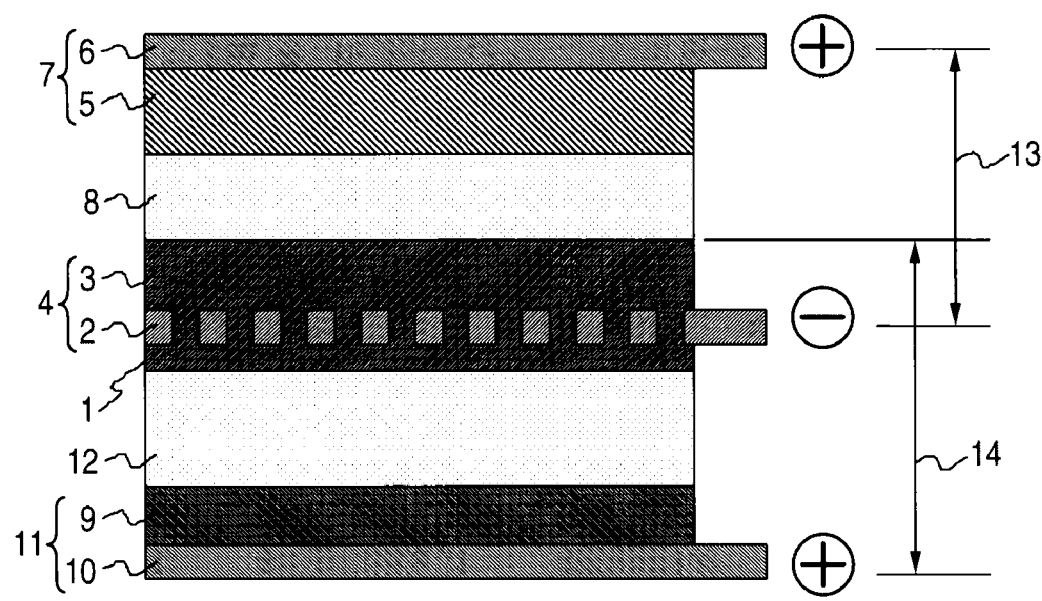
FIG. 12 is a sectional schematic view of an energy storage device cell according to Embodiment 6 of the present invention.

FIG. 12 is a sectional schematic view of an energy storage device cell according to Embodiment 6 of the present invention. Embodiment 6 differs from Embodiment 1 in the anode electrode layer 3, which has also been formed inside the through-holes 1 provided in the anode collector foil 2 and on the face of the anode collector foil 2 facing the second separator 12. Such a configuration is likely to occur when, as in Embodiment 5, when the anode electrode layer 3 is applied using, for example, screen printing on the anode collector foil 2 provided in advance with the through-holes 1.

In such a configuration, since migration of lithium ions is slightly restricted as compared with that in Embodiment 1, response of charging and discharging characteristics is slightly inferior, but this does not come into question unless a very fast charge and discharge is performed, and an effect of suppressing deterioration of electrical characteristics can be obtained as in Embodiment 1.

While the present invention has been shown and described with reference to certain embodiments thereof, it will be understood by those skilled in the art that various changes in form and details may be made therein without departing from the spirit and scope of the invention as defined by the appended claims.

What is claimed is:

1. An energy storage device cell comprising:
a capacitor cathode including:
a capacitor cathode collector foil; and
a capacitor cathode electrode layer formed on one face of the capacitor cathode collector foil, the capacitor cathode electrode layer containing microparticles of activated carbon;
a first separator;
a common anode including:
an anode collector foil having a through-hole; and
an anode electrode layer formed on one face of the anode collector foil;
a second separator; and
a battery cathode including:
a battery cathode collector foil; and
a battery cathode electrode layer formed on one face of the battery cathode collector foil, the battery cathode electrode layer containing particles of a lithium-containing metal compound,
wherein the first separator is sandwiched by the capacitor cathode electrode layer and the anode electrode layer,
the second separator is sandwiched by the anode collector foil and the battery cathode electrode layer, and
the anode collector foil contacts the second separator.

2. The energy storage device cell according to claim 1, wherein the lithium-containing metal compound is olivine lithium iron phosphate.

3. The energy storage device cell according to claim 1, wherein an average pore diameter of the second separator is larger than an average pore diameter of the first separator.

4. The energy storage device cell according to claim 1, wherein the second separator is formed of olefinic porous paper that melts at 200° C. or less.

5. The energy storage device cell according to claim 1, wherein the capacitor cathode, the first separator, the common anode, the second separator, and the battery cathode are sequentially laminated in multiple layers.

6. The energy storage device cell according to claim 1, wherein the capacitor cathode, the first separator, the common anode, the second separator, and the battery cathode are sequentially laminated and wound.

7. The energy storage device cell according to claim 1, wherein an electrical insulating coating is formed on a surface of the anode collector foil facing the second separator.

8. An energy storage system, comprising:
an energy storage device cell according to claim 2; and
a charging and discharging controller configured to set the energy storage device cell at an upper limit voltage of 4V or less and at a lower limit voltage of 2V or more.

* * * * *